Oct. 16, 1923.
W. E. KARNS
1,470,847
GAS PRODUCING AND COOLING DEVICE
Filed March 1, 1919
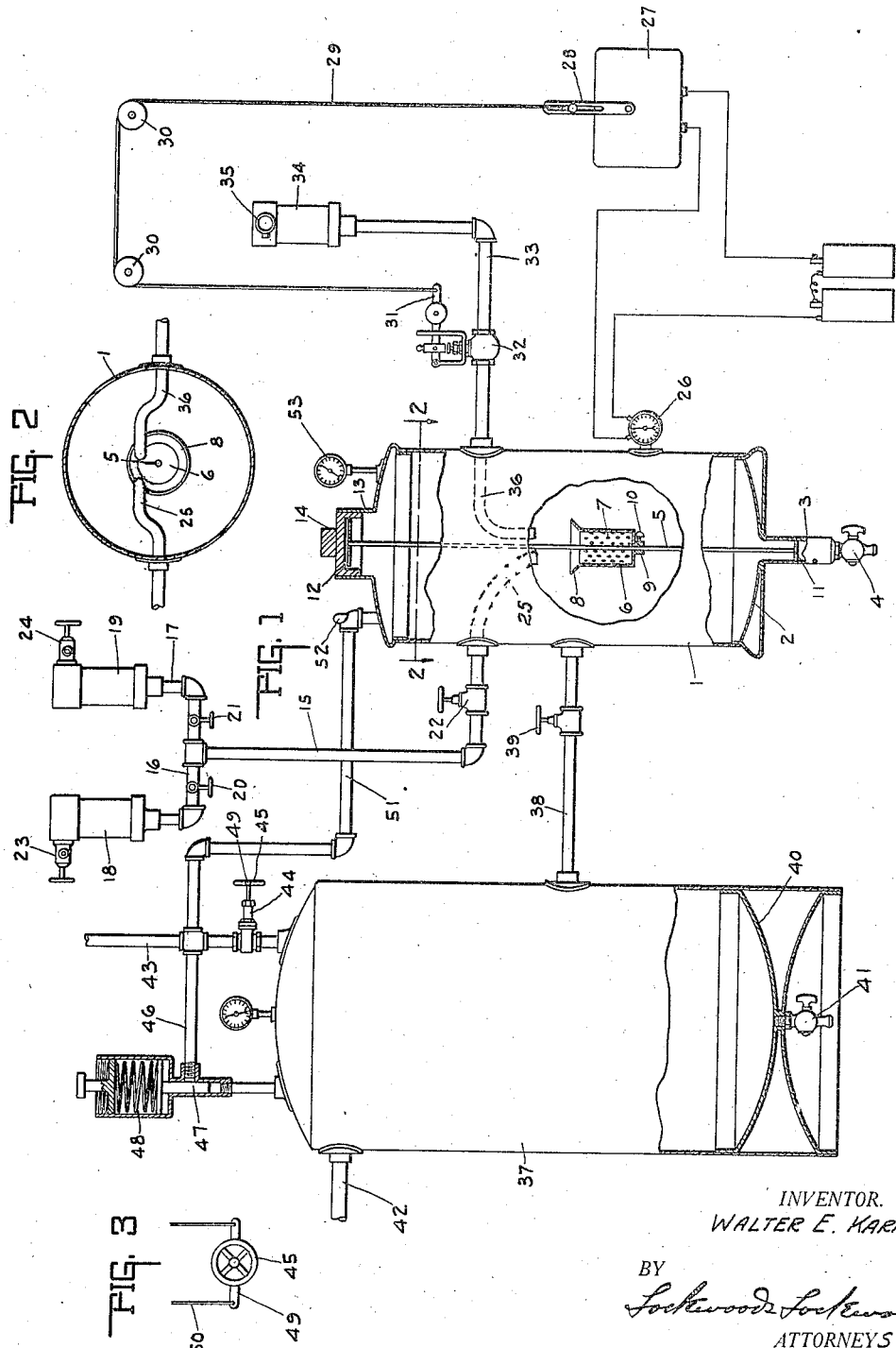
INVENTOR.
WALTER E. KARNS.
BY
Lockwood Lockwood
ATTORNEYS Patented Oct. 16, 1923.

1,470,847

UNITED STATES PATENT OFFICE.

WALTER E. KARNS, OF INDIANAPOLIS, INDIANA, ASSIGNOR OF ONE-EIGHTH TO M. A. WALLACE, OF INDIANAPOLIS, INDIANA.

GAS PRODUCING AND COOLING DEVICE.

Application filed March 1, 1919. Serial No. 280,000.

*To all whom it may concern:*

Be it known that I, WALTER E. KARNS, a citizen of the United States, and a resident of Indianapolis, county of Marion, and State of Indiana, have invented a certain new and useful Gas Producing and Cooling Device; and I do hereby declare that the following is a full, clear, and exact description thereof, reference being had to the accompanying drawings, in which like numerals refer to like parts.

This invention relates to a gas producing and cooling device, and particularly to that form of device used in producing acetylene gas.

The prime feature of the invention is the provision of means for discharging liquid chemicals over the carbides employed for producing gas, whereby the gas will be prevented from becoming unduly heated under ordinary conditions.

A further feature of the invention is the provision of means for automatically discharging one chemical in quantity over the gas producing substance in case the heat arises to a predetermined degree, due to the improper action of the liquid chemical distributing parts.

A further feature of the invention is the provision of means for discharging the liquid chemicals directly on to the gas producing chemicals for rapidly converting the latter chemicals into gas, or in so positioning the discharge spouts for the liquid chemicals that said liquid chemicals will discharge into the lower portion of the mixing chamber of the device and gradually envelop the gas producing chemicals, whereby the latter chemicals will be slowly converted into gas.

A further feature of the invention is the provision of means for regulating the flow of the liquid chemicals on to the gas producing chemicals.

A further feature of the invention is the provision of means for quickly relieving the storage tank of the gas in case of fire so as to prevent explosion of the tank from over heating the same, such releasing means being so constructed that it may be operated at a distance from the tank.

A further feature of the invention is the provision of means for automatically relieving the pressure in the tank after it has reached a predetermined degree of pressure.

Other objects and advantages will be hereinafter more fully set forth and pointed out in the accompanying specification.

In the accompanying drawings, which are made a part of this application, Fig. 1 is a diagrammatic view of a gas producing mechanism with parts thereof broken out. Fig. 2 is a sectional view as seen on line 2—2, Fig. 1. Fig. 3 is an elevation showing means for operating the releasing valve.

Referring to the drawings, in which similar reference numerals designate corresponding parts throughout the several views, 1 indicates a mixing chamber which is preferably formed cylindrically and oblong, the lower end of the mixing chamber having an inclined bottom wall 2 so as to cause the contents of the mixing chamber to move by gravity toward the center of the chamber and into a discharge nozzle 3 depending from the mixing chamber, a stop cock 4 being employed for opening or closing said nozzle.

Extending vertically and centrally through the mixing chamber 1 is a rod 5 upon which is mounted a chemical container 6, the wall of which is provided with a plurality of perforations 7 through which the chemical contained within the container and the liquid chemicals discharged thereon, may leave the confines of the container gradually. The lower end of the container 6 is closed while the upper end thereof is open and provided with a flaring flange 8, the lower closed end of the container 6 having a collar 9 which surrounds the rod 5 through which projects a set screw 10 for adjustably securing the container at any height upon the rod. The lower end of the rod 5 rests upon a perforated plate 11 located in the discharge nozzle 3, while the upper end thereof is provided with a disk or head 12, which enters an extension 13 formed on the upper end of the mixing chamber, the diameter of said extension being such as to permit the removal of the chemical container from the mixing chamber. After the chemical container 6 has been entered in the mixing chamber 1, a cap 14 is screwed into the extension so as to prevent the escape of the gases therethrough, or the casual removal of the chemical container.

In order to produce a gas, the solid matter, such as calcium-carbide is entered in the chemical container 6, and liquid is then discharged into the open end of the container to set up a chemical action between the liquid and the solid matter such as carbide to produce the gas, said liquid preferably consisting of water, and in order to prevent heat, common in gases of this nature, a due mixture of a liquid chemical is added to the water, preferably consisting of denatured alcohol. This is according to a process disclosed and claimed in my copending application, Serial No. 280,392, filed March 3, 1919. The water and alcohol are fed by gravity into the container through a pipe 15 which extends a distance above the mixing chamber 1, and is provided at its upper end with elbows 16 and 17, to which are attached tanks 18 and 19 for the reception of water and the alcohol respectively. The control valves 20 and 21 are inserted in the elbows 16 and 17 respectively for controlling the passage of the liquid from the tanks 18 and 19, and likewise a valve 22 is placed in the pipe 15 so that all the liquid may be shut off from the container when desired. As more or less pressure results in the tanks 18 and 19, the liquids are introduced into said tanks through valves 23 and 24 respectively at the upper ends thereof. The inner end of the pipe 15 terminates in a nozzle 25, the free end of which is normally positioned over the container 6, but may be slightly rotated in its joint at the valve 22, so as to cause the liquid to discharge at one side of the container 6, directly into the mixing chamber 1 for a purpose to be hereinafter set forth.

If for any reason the proper mixture from the tanks 18 and 19 should fail, that is to say, should a less amount of the alcohol be discharged on to the container than the prescribed quantity, overheating would result, and to provide against such an emergency, automatically operated means is utilized for supplying the proper amount of the alcohol. To this end, a heat influenced thermometer gauge and electric switch 26 is attached to the mixing chamber 1, and this gauge is electrically connected to a motor 27, which has a crank 28 thereon adapted to be swung in the arc of a circle by the operation of the motor. The crank 28 is in turn attached to a cable 29 which passes over sheaves 30 and is attached to a lever 31 of a valve 32, said valve being interposed to a feed pipe 33, one end of which enters the mixing chamber 1 and the opposite end a tank 34, in which is stored a quantity of alcohol. The upper end of this tank is also closed with a valve 35 so as to make the same air tight. The inner end of the pipe 33 terminates in a nozzle 36 which is likewise positioned over one edge of the container 6, as best shown in Fig. 2. The container is removed from the mixing chamber by elevating the rod 5 until the disk 12 passes above the edge of the extension 13, when the rod 5 may be pushed to one side and then elevated, the container 6 readily passing by the ends of the nozzles.

The gas formed by the carbide passes from the mixing chamber into a storage tank 37, which may be of any preferred size, the mixing chamber and tank being connected by a pipe 38 in which is placed a valve 39 for controlling the discharge of gas from the mixing chamber to the tank. The lower wall 40 of the tank is preferably concave so that any sediment in the gas will move by gravity to the axial center of the bottom wall and may be discharged therefrom through a stop cock 41. The gas passes from the storage tank 37 through the pipe line 42 to any suitable point. An escape pipe 43 is attached to the upper portion of the tank 37 which has a valve 44 at a point above the tank, and when the valve wheel 45 is operated to open the valve 44 the gas will escape from the tank and pass into the atmosphere. As a further precautionary measure against explosion, an auxiliary escape pipe 46 is extended from the top portion of the tank and is connected to the escape pipe 43 at a point above the valve 44, said auxiliary pipe having a pop valve structure 47 controlled by means of a pressure spring 48. Under normal conditions the pop valve 47 will be held closed by the pressure of the spring 48 so that the gas cannot escape through the auxiliary escape pipe into the main escape pipe, but under unusual pressure the pop valve will be automatically opened and release the gas, thus reducing the pressure in the storage tank.

As a matter of safety the valve wheel 45 has ears 49 extending from opposite sides thereof (Fig. 3) to which are attached chains 50, and said chains are preferably extended to a point where the valve may be operated from the exterior of the building, so that should the building catch fire and it would be impossible to gain access to the tank from the interior of the building, the valve may be operated to release the gas from the exterior of the building, thus preventing an explosion.

In operating the device according to my previously mentioned process, the tank 18 is filled with water, and the tanks 19 and 34 with liquid chemical, the valves 20, 21 and 32 being closed. The chemical container 6 is also removed from the mixing chamber 1 and filled with calcium carbide, after which the container is returned into the mixing chamber and the cap 14 screwed into the end of the extension 13. The valves 20 and 21, and the valve 22 are then opened, and valves 20 and 21 then adjusted to permit the escape of the proper amount of water and alcohol from their respective tanks to produce the proper mixture to be discharged into the upper end of the container 6.

When the mixture strikes the contents of the container the carbide and water react, the alcohol preventing violent reaction of the carbide.

Should for any reason the chemical in the tank 19 fail to maintain the gas in a cooled state as it is formed, and likewise prevent heating of the sediment in the bottom of the mixing chamber 1, so that considerable temperature will be formed in the mixing chamber, the motor 27 will be energized and the valve 32 opened, thereby admitting the liquid from the tank 37, and said liquid may be admitted in such quantities as to entirely stop the formation of gas from the carbide. So long as no water comes in contact with the carbide remaining in the container, such carbide will be preserved until water is again discharged thereon.

The container 6 is of such dimensions as to produce a sufficient amount of gas to fill the tank to its capacity, and the amount of the gas may be formed rapidly or slowly as desired. That is to say, when the container is positioned as shown in Fig. 1 of the drawings, and the water and alcohol is turned on to their full mixing capacity, the full amount of gas will be rapidly formed, but by lowering the container on the rod 5 and then turning the end of the nozzle 25 until the contents is discharged directly into the mixing chamber without coming in direct contact with the chemical container, the gas will be slowly formed as the water arises in the mixing chamber, and as the contents of the container will form but a single tank of the gas, it is not necessary to pay particular attention to the apparatus during this operation.

In recharging the container 6 it is necessary to close both the valves 22 and 39, and should a recharge be entered in the mixing chamber 1 and the operator should open the valve 22 and forget to open the valve 39, the pressure in the mixing chamber 1 would become so great that an explosion might occur, and to guard against such an emergency a pipe 51 is extended from the mixing chamber 1 to the escape pipe 43 and is connected to the escape pipe above the valve 44. In the pipe 51 is provided an automatically operated valve 52 which will remain closed under ordinary pressure but will automatically open when the pressure arises above a certain degree. In addition to the escape pipe 51 a gauge 53 is provided so that the pressure within the mixing chamber may be ascertained at any time.

The invention claimed is:

1. In a combined gas producing and cooling device, a mixing chamber, a container for chemicals in said chamber a water tank a chemical tank, means for conveying water and liquid chemical together from said tanks and discharging their mixture on to the chemical in the container for expanding and forming a gas from the chemical in the container, and means for independently regulating the flow of water and liquid chemicals.

2. In a combined gas producing and cooling device, a mixing chamber, a container within said mixing chamber for the reception of a gas producing chemical, a water containing tank, a liquid chemical containing tank, means for conveying the water and liquid chemicals into said mixing chamber, the water causing said gas producing chemicals to form gas and the liquid chemical preventing undue heating of the gas, a second liquid chemical containing tank, means for conveying the latter liquid chemical into the mixing chamber and in position to discharge into said container for stopping the formation of gas from the chemical in the container, and automatically operated means for releasing the liquid chemical from the last tank.

3. In a combined gas producing and cooling device, a mixing chamber, a container for chemicals in said chamber, water-supply means, liquid-chemical-supply means supplying liquid chemical to the water outside said container for chemicals, and means for conducting the water and liquid chemical together on to the chemical in the container.

4. In a combined gas producing and cooling device, a mixing chamber, a container for chemicals in said chamber, water-supply means, liquid-chemical-supply means supplying liquid chemical to the water outside said container for chemicals, means for conducting the water and liquid chemical together on to the chemical in the container, and means for varying the proportions of the water and liquid chemical thus conducted.

5. In a combined gas producing and cooling device, a mixing chamber, a container for chemicals in said chamber, water-supply means, liquid-chemical-supply means supplying liquid chemical to the water outside said container for chemicals, means for conducting the water and liquid chemical together on to the chemical in the container in normal proportions for normal operation, and means for increasing the proportion of liquid chemical supplied to the chemical in the container above its normal proportion, for counteracting the effects of abnormal operation.

6. In a combined gas producing and cooling device, a mixing chamber, a chemical container therein, a water containing tank, a liquid chemical containing tank, means for mixing and conveying the water and liquid chemical into position to discharge into said container, means to regulate the flow of the water and liquid chemical, an additional liquid chemical containing tank, means to convey the chemical therefrom and discharge the same into said container, and heat operated means for releasing the latter liquid chemical.

7. In a combined gas producing and cooling device, a mixing chamber, a chemical container therein, means for adjustably mounting said container so as to permit its being lowered within the liquid mixture in said chamber, and means for introducing a liquid mixture directly into the chemical in said container for rapidly converting the chemical into gas or introducing the liquid mixture into said chamber so as to avoid direct discharge on said chemical, for slowly converting the chemical into gas, without increasing or decreasing the amount of chemical used.

8. In a combined gas producing and cooling device, a mixing chamber, a container within said mixing chamber for the reception of a gas-producing chemical, a water supply and a liquid-chemical supply to said container in said mixing chamber, the water causing said gas-producing chemical to form gas and the liquid chemical preventing overheating of the gas, and automatically operated means for increasing the supply of liquid chemical, for stopping the formation of gas in said mixing chamber under abnormal conditions therein.

9. In a combined gas producing and cooling device, a mixing chamber, a container within said mixing chamber for the reception of a gas-producing chemical, a water supply and a liquid-chemical supply to said container in said mixing chamber, the water causing said gas-producing chemical to form gas and the liquid chemical preventing overheating of the gas, and heat-operated means for increasing the supply of liquid chemical, for stopping the formation of gas in said mixing chamber when the gas in said chamber becomes overheated.

10. In a combined gas producing and cooling device, a mixing chamber, a container for gas-producing chemical, a rod for supporting said container, extending upright near the center of said mixing chamber, means for mounting said container for adjustment up and down on said rod, said chamber having a nozzle in its bottom in alinement with said rod, and having an opening in its top in alinement with said rod, to admit said rod and said container, a gas-tight closure for said opening, and elements on said rod, fitting in said nozzle and in said opening, respectively, to hold said rod and said container in their normal upright position.

In witness whereof, I have hereunto affixed my signature.

WALTER E. KARNS.